United States Patent [19]

Yamauchi et al.

[11] 4,418,666
[45] Dec. 6, 1983

[54] DEVICE FOR CONTROLLING THE IDLING SPEED OF AN ENGINE

[75] Inventors: Yasutaka Yamauchi, Toyota; Hiroshi Itou, Nagoya, both of Japan

[73] Assignees: Nippondenso Co., Ltd., Kariya; Toyota Jidosha Kogyo Kabushiki Kaisha, Toyota, both of Japan

[21] Appl. No.: 391,474

[22] Filed: Jun. 22, 1982

[30] Foreign Application Priority Data

Aug. 7, 1981 [JP] Japan .................. 56-124238

[51] Int. Cl.³ .................. F02B 33/00; F02D 11/10
[52] U.S. Cl. .................. 123/339; 123/361
[58] Field of Search .................. 123/339, 361

[56] References Cited

U.S. PATENT DOCUMENTS 4,359,983 11/1982 Carlson .................. 123/339
4,364,348 12/1982 Itoh .................. 123/339
4,378,768 4/1983 Itoh .................. 123/340

Primary Examiner—Ronald B. Cox
Attorney, Agent, or Firm—Kenyon & Kenyon

[57] ABSTRACT

An engine comprising a main intake passage having a throttle valve therein. A bypass passage is branched off from the main intake passage located upstream of the throttle valve and is connected to the main intake passage located downstream of the throttle valve. A flow control valve, actuated by a step motor, is arranged in the bypass passage. The step motor is controlled by an electronic control unit having three memories. The data, indicating the step position of the step motor, is stored in the three memories at the same time. When at least two pieces of data among the data stored in the three memories are the same, it is determined that the two pieces of data are considered as true data indicating the actual step position of the step motor.

7 Claims, 17 Drawing Figures

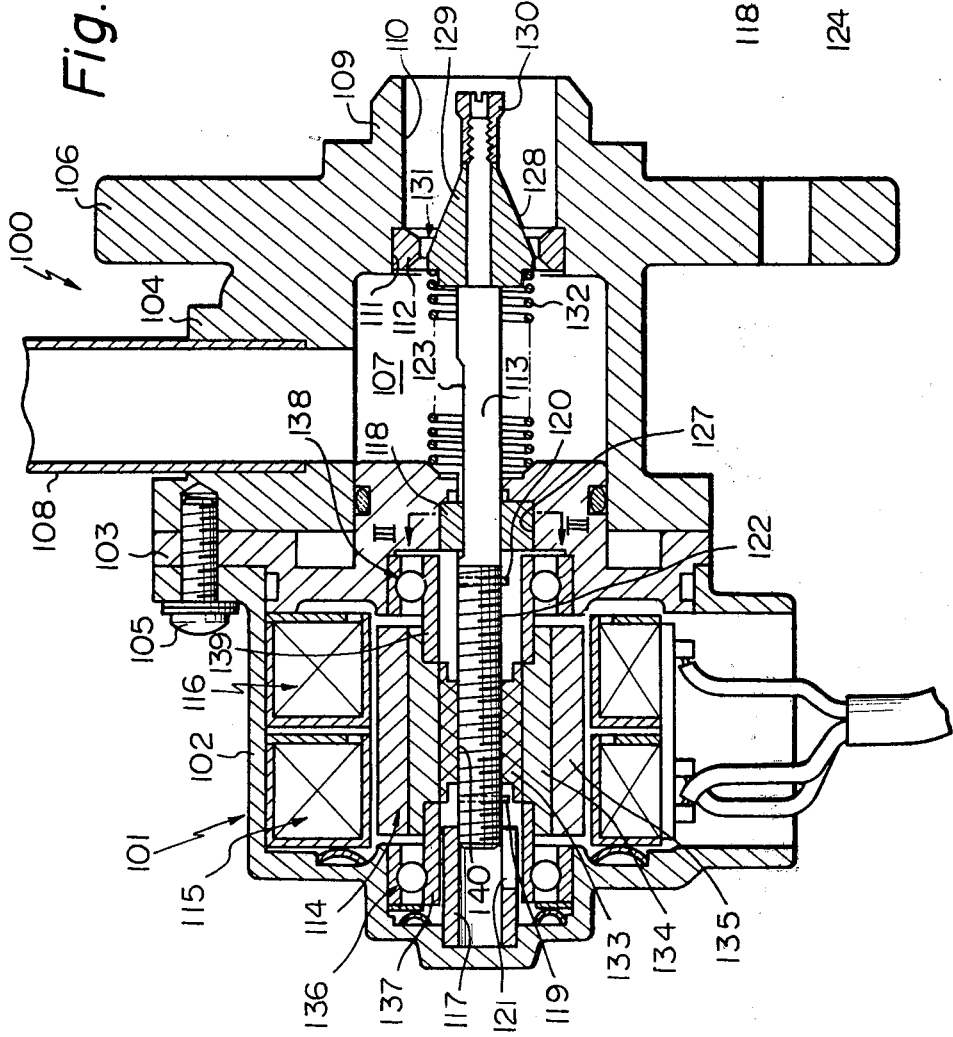

DEVICE FOR CONTROLLING THE IDLING SPEED OF AN ENGINE

BACKGROUND OF THE INVENTION

The present invention relates to a device for suitably controlling the idling speed of an internal combustion engine.

Various devices for controlling the idling speed of an internal combustion engine have been known. Among these devices, a device for controlling the idling speed by controlling the amount of air fed into the cylinder of the engine has been put into practical use. This device comprises a bypass passage bypassing a throttle valve and a vacuum-operated flow rate control valve arranged in the bypass passage, and the opening area of the flow rate control valve is controlled by an electromagnetic means which controls the level of the vacuum acting on the vacuum chamber of the flow rate control valve. In addition, another device for controlling the idling speed was recently proposed in which the flow area of the control valve arranged in the bypass passage is controlled by a step motor. However, since such a device is so constructed that the data indicating the step position of the step motor, is stored in a single memory, if errors occur in the content of the memory, a problem occurs in that it is difficult to control the idling speed. In order to eliminate such a problem, a feedback control-type device for controlling the idling speed has been proposed in which a sensor is provided for detecting the step position of the step motor. However, such a feedback control-type device has such drawbacks that the manufacturing cost is increased and the durability and the reliability deteriorate.

SUMMARY OF THE INVENTION

An object of the present invention is to provide a device which is capable of always precisely controlling the idling speed and is capable of reducing the manufacturing cost and improving the durability and the reliability.

According to the present invention, there is provided a device for controlling the idling speed of an engine comprising a main intake passage, a throttle valve arranged in the main intake passage, a bypass passage branching off from the main intake passage upstream of the throttle valve and being connected to the main intake passage downstream of the throttle valve, and a control valve arranged in the bypass passage, said device comprising: a step motor actuating the control valve and having a plurality of step positions which are changed in accordance with the rotating motion of said step motor; a plurality of memories each storing data which indicates the step position at which said step motor is positioned; first means for comparing the step positions stored in said memories and determining the actual step position of said step motor; second means for detecting the operating condition of the engine to produce an output signal indicating that the engine is operating in an idling state; and electronic control means operated in response to the output signal of said second means and producing a step motor drive signal for rotating said step motor until said actual step position becomes equal to a predetermined desired step position when the engine is idling.

The present invention may be more fully understood from the description of a preferred embodiment of the invention set forth below, together with the accompanying drawings.

BRIEF DESCRIPTION OF THE DRAWINGS

In the drawings:

FIG. 2 is a cross-sectional side view of a flow control valve device;

FIG. 3 is a cross-sectional view taken along the line III—III in FIG. 2;

DESCRIPTION OF A PREFERRED EMBODIMENT

Figure 1:
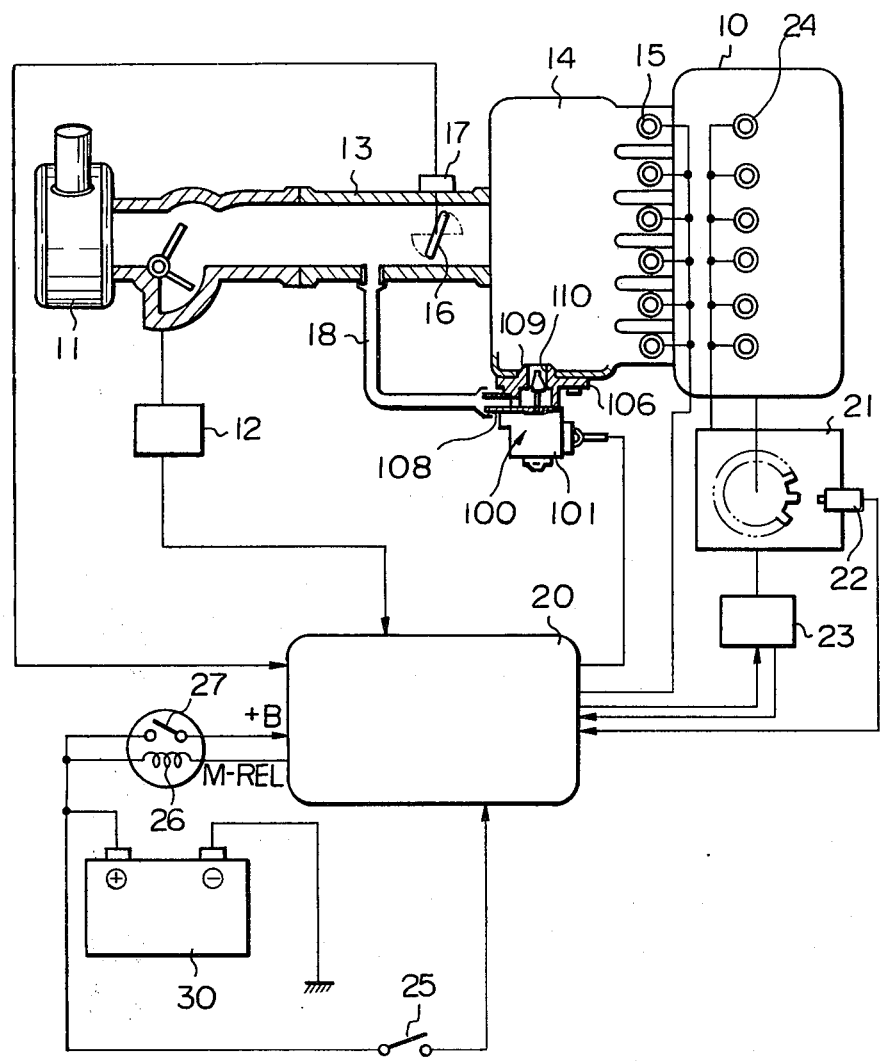
FIG. 1 is a partial cross-sectional side view of an intake system equipped with an idling speed control device according to the present invention.
Figure 4:
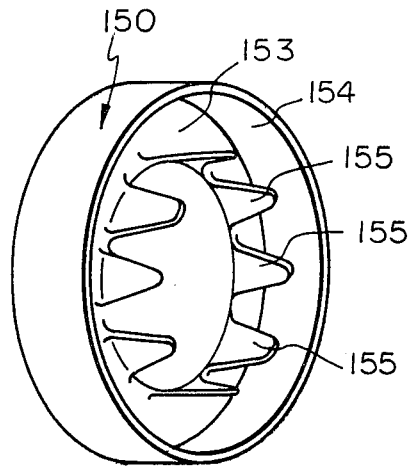
FIG. 4 is a perspective view of a stator core member.
Figure 5:
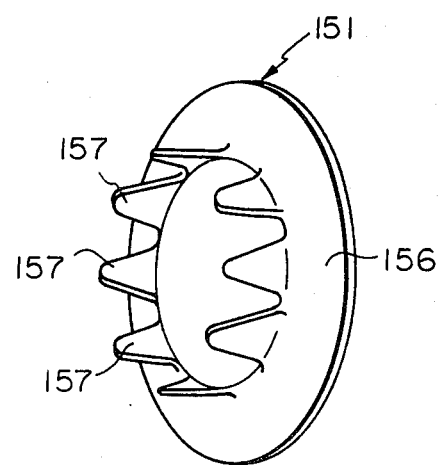
FIG. 5 is a perspective view of a stator core member.

Referring to FIG. 1, 10 designates a spark-ignition-type 4-cycle engine, 11 an air cleaner, 12 an air flow meter, 13 an intake duct, 14 a surge tank having a plurality of branch pipes, and 15 fuel injectors arranged on the corresponding branch pipes of the surge tank 14. Main air is fed into the cylinders of the engine 1 via the air cleaner 11, the air flow meter 12, the intake duct 13, the surge tank 14, and the branch pipes of the surge tank 14, and fuel is injected from the fuel injectors 15 into the main air during a time period determined by an electronic control unit 20. The amount of main air is controlled by a throttle valve 16 which is operated by the accelerator pedal (not shown). A throttle sensor 17 is connected to the throttle valve 16 and comprises an idle switch (IDL) for detecting the completely closed state of the throttle valve 16 and a power switch (PSW) for detecting the fully opened state of the throttle valve 16. The idle switch IDL and the power switch PSW are connected to the electronic control unit 20. An electromagnetic pickup 22, functioning as an engine-speed sensor, is arranged in a distributor 21, and the engine speed signal, issued from the electromagnetic pickup 22, is input into the electromagnetic control unit 20.

An ignition 23 produces an ignition signal on the basis of the output signal of the electronic control unit 20. This ignition signal is fed into spark plugs 24 via the distributor 21 and, thereby, ignition is carried out. In addition, signals (IGf) indicating whether a high voltage is applied to the distributor 21 are input into the electronic control unit 20 from the ignitor 23. Power is supplied to the electronic control unit 20 by turning the ignition switch 25 to [ON]. As described hereinafter, when the ignition switch 25 is turned to [ON], electric current is fed into a coil 26 on the basis of the output signal M-REL of the electronic control unit 20 and, thus, the main relay switch 27 is turned to [ON]. This main relay switch 27 remains in the ON position for a little while after the ignition switch 25 is turned to OFF so that power can be supplied to the electronic control unit 20 after the ignition switch 25 is turned to OFF.

A flow control valve device 100 is mounted on the surge tank 14. As illustrated in FIG. 2, the flow control valve device 100 comprises a motor housing 102 supporting a step motor 101, a motor housing end plate 103, and a valve housing 104. The motor housing 102, the end plate 103, and the valve housing 104 are interconnected to each other by means of bolts 105. As illustrated in FIGS. 1 and 2, a flange 106 is formed in one piece on the valve housing 104 and is fixed onto the outer wall of the surge tank 14 by means of bolts. A valve chamber 107 is formed in the valve housing 104 and is connected via an air conduit 18 and a bypass pipe 108, fixed onto the valve housing 104, to the inside of the intake duct 13, which is located upstream of the throttle valve 16. In addition, a hollow cylindrical projection 109, projecting into the surge tank 14, is formed in one piece on the side wall of the flange 106, and a cylindrical air outflow bore 110 is formed in the hollow cylindrical projection 109. An annular groove 111 is formed on the inner end of the air outflow bore 110, and a valve seat 112 is fitted into the annular groove 111.

As illustrated in FIG. 2, the step motor 101 comprises a valve shaft 113, a rotor 114 coaxially arranged with the valve shaft 113, and a pair of stators 115, 116, each being stationarily arranged in the motor housing 102 and spaced a slight distance from the cylindrical outer wall of the rotor 114. The end portion of the valve shaft 113 is supported by a hollow cylindrical bearing 117 made of a sintered metal and fixed onto the motor housing 102, and the intermediate portion of the valve shaft 113 is supported by a hollow cylindrical bearing 118 made of a sintered metal and fixed onto the end plate 103. A first stop pin 119, which abuts against the rotor 114 when the valve shaft 113 reaches the most advanced position, is fixed onto the valve shaft 113, and a second stop pin 120, which abuts against the rotor 114 when the valve shaft 113 reaches the most retractable position, is fixed onto the valve shaft 113. In addition, an axially extending slot 121, into which the first stop pin 119 is able to enter, is formed in the bearing 117. External screw threads 122 are formed on the outer circumferential wall of valve shaft 113, which is located within the motor housing 102. The external screw threads 122 extend towards the right in FIG. 2 from the left end of the valve shaft 113 and terminate a slight distance from where the valve shaft 113 passes through the second stop pin 120. In addition, an axially extending flat portion 123, which extends towards the right in FIG. 2 from a position near the terminating position of the external screw threads 122, is formed on the outer circumferential wall of the valve shaft 113. As illustrated in FIG. 3, the inner wall of the shaft-bearing hole of the bearing 118 comprises a cylindrical wall portion 124 and a flat wall portion 125 which have a complementary shape relative to the outer circumferential wall of the valve shaft 113. Consequently, the valve shaft 113 is supported by the bearing 118 so that the valve shaft 113 cannot be rotated but is capable of sliding in the axial direction. In addition, as illustrated in FIG. 3, an outwardly projecting arm 126 is formed in one piece on the outer circumferential wall of the bearing 118, and a bearing-receiving hole 127 (FIG. 2), having a contour shape which is the same as that of the bearing 118, is formed on the inner wall of the end plate 103. Consequently, when the bearing 118 is fitted into the bearing-receiving hole 127, as illustrated in FIG. 2, the bearing 118 is non-rotatably supported by the end plate 103. A valve head 129, having a substantially conical shaped outer wall 128, is secured onto the tip of the valve shaft 113 by means of a nut 130, and an annular air flow passage 131 is formed between the valve seat 112 and the conical outer wall 128 of the valve head 129. In addition, a compression spring 132 is inserted between the valve head 129 and the end plate 103 in the valve chamber 107.

As illustrated in FIG. 2, the rotor 114 comprises a hollow cylindrical inner body 133 made of a synthetic resin, a hollow cylindrical intermediate body 134 made of a metallic material and rigidly fitted onto the outer circumferential wall of the hollow cylindrical inner body 133, and a hollow cylindrical outer body 135 made of a permanent magnet and fixed onto the outer circumferential wall of the hollow cylindrical intermediate body 134 with an adhesive. As will be hereinafter described, an N pole and an S pole are alternately formed on the outer circumferential wall of the hollow cylindrical outer body 135 made of a permanent magnet along the circumferential direction of the outer circumferential wall of the hollow cylindrical outer body 135. As illustrated in FIG. 2, one end of the hollow cylindrical intermediate body 134 is supported by the inner race 137 of a ball bearing 136 which is supported by the motor housing 102, and the other end of the hollow cylindrical intermediate body 134 is supported by the inner race 139 of a ball bearing 138 which is supported by the end plate 103. Consequently, the rotor 114 is rotatably supported by a pair of ball bearings 136 and 138. Internal screw threads 140, which are engaged with the external screw threads 122 of the valve shaft 113, are formed on the inner wall of the central bore of the hollow cylindrical inner body 133. Therefore, when the rotor 114 rotates, the valve shaft 113 is caused to move in the axial direction.

Figure 7:
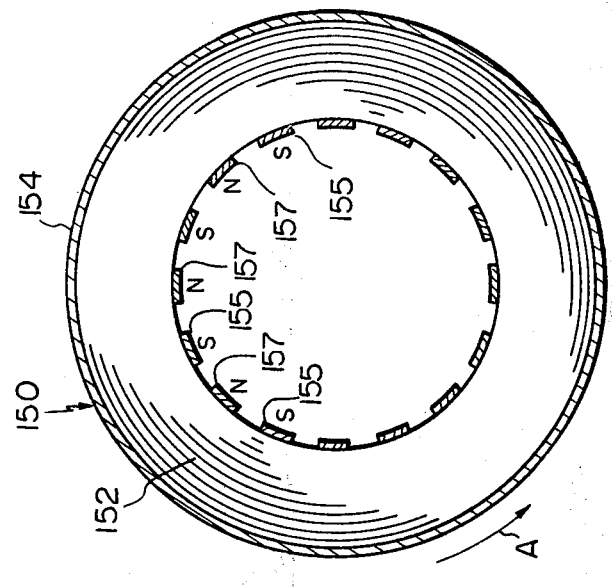
FIG. 7 is a cross-sectional view taken along the line VII—VII in FIG. 6.
Figure 6:
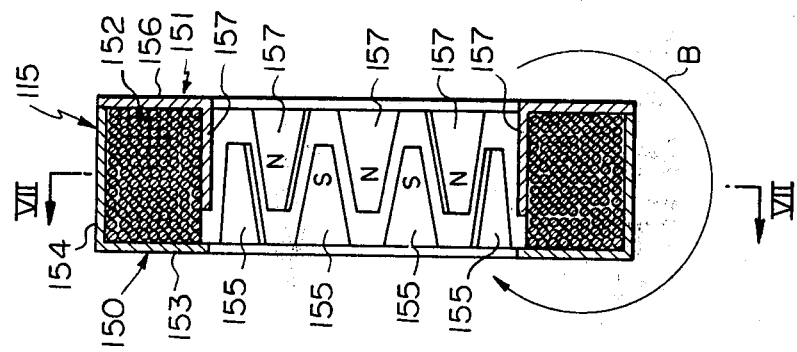
FIG. 6 is a cross-sectional side view of a stator.

The stators 115 and 116, which are stationarily arranged in the motor housing 102, have the same construction and, therefore, the construction of the stator 115 only will be hereinafter described with reference to FIGS. 4 through 7. Referring to FIGS. 4 through 7, the stator 115 comprises a pair of stator core members 150 and 151 and a stator coil 152. The stator core member 150 comprises an annular side wall portion 153, an outer cylindrical portion 154, and eight pole pieces 155 extending perpendicular to the annular side wall portion 153 from the inner periphery of the annular side wall portion 153. The pole pieces 155 have a substantially triangular shape, and each of the pole pieces 155 is spaced the same angular distance from the adjacent pole piece 155. On the other hand, the stator core member 151 comprises an annular side wall portion 156 and eight pole pieces 157 extending perpendicular to the annular side wall portion 156 from the inner periphery of the annular side wall portion 156. The pole pieces 157 have a substantially triangular shape, and each of the pole pieces 157 is spaced the same angular distance from the adjacent pole piece 157. The stator core members 150 and 151 are assembled so that each of the pole pieces 155 is spaced the same angular distance from the adjacent pole piece 157, as illustrated in FIGS. 6 and 7. When the stator core members 150 and 151 are assembled, the stator core members 150 and 151 construct a stator core. When an electric current is fed into the stator coil 152 and flows within the stator coil 152 in the direction illustrated by the arrow A in FIG. 7, a magnetic field, the direction of which is illustrated by the arrow B in FIG. 6, generates around the stator coil 152. As a result of this, the S poles are produced in the pole pieces 155 and, at the same time, the N poles are produced in the pole pieces 157. Consequently, it will be understood that an N pole and an S pole are alternately formed on the inner circumferential wall of the stator 115. On the other hand, if an electric current flows within the stator coil 152 in a direction which is opposite to that illustrated by the arrow A in FIG. 7, the N poles are produced in the pole pieces 157 and, at the same time, the S poles are produced in the pole pieces 155.

Figure 8:
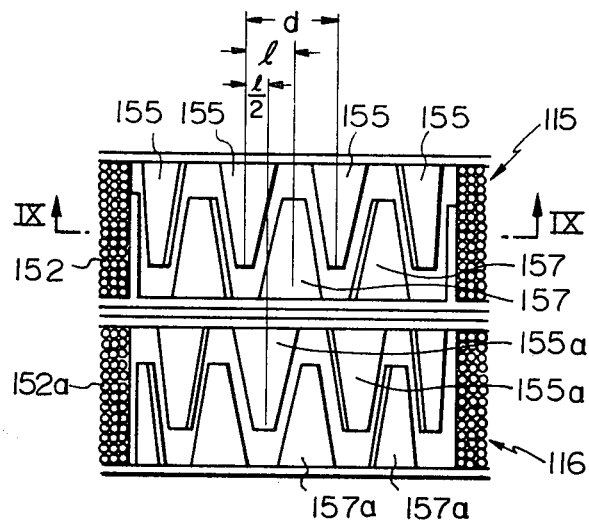
FIG. 8 is a cross-sectional plan view of the stator illustrated in FIG. 2.
Figure 9:
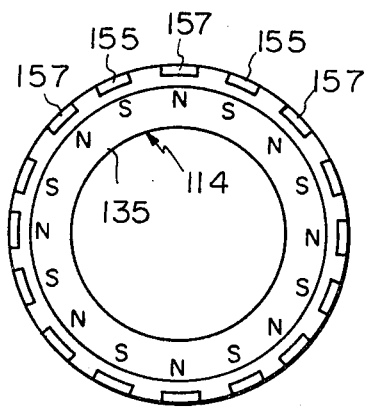
FIG. 9 is a schematic cross-sectional side view taken along the line IX—IX in FIG. 8.

FIG. 8 illustrates a case wherein the stator 115 and the stator 116 are arranged in tandem as illustrated in FIG. 2. As illustrated in FIG. 8, assuming that the distance between the pole piece 155 of the stator 115 and the adjacent pole piece 157 of the stator 115 is indicated by l, each of the pole pieces 155a of the stator 116 is offset by l/2 from the pole piece 155 of the stator 115, which is arranged nearest to the pole piece 155a of the stator 116. That is, assuming that the distance d between the adjacent pole pieces 155 of the stator 115 is one pitch, each of the pole pieces 155a of the stator 116 is offset by 1/4 of a pitch from the pole piece 155 of the stator 115, which is arranged nearest to the pole piece 155a of the stator 116. On the other hand, as illustrated in FIG. 9, the N pole and the S pole are alternately formed on the outer circumferential wall of the hollow cylindrical outer body 135 of the rotor 114 along the circumferential direction of the outer circumferential wall of the hollow cylindrical outer body 135, and the distance between the N pole and the S pole, which poles are arranged adjacent to each other, is equal to the distance between the pole piece 155 and the pole piece 157 of the stator 115, which pieces 155 and 157 are arranged adjacent to each other.

Figure 10:
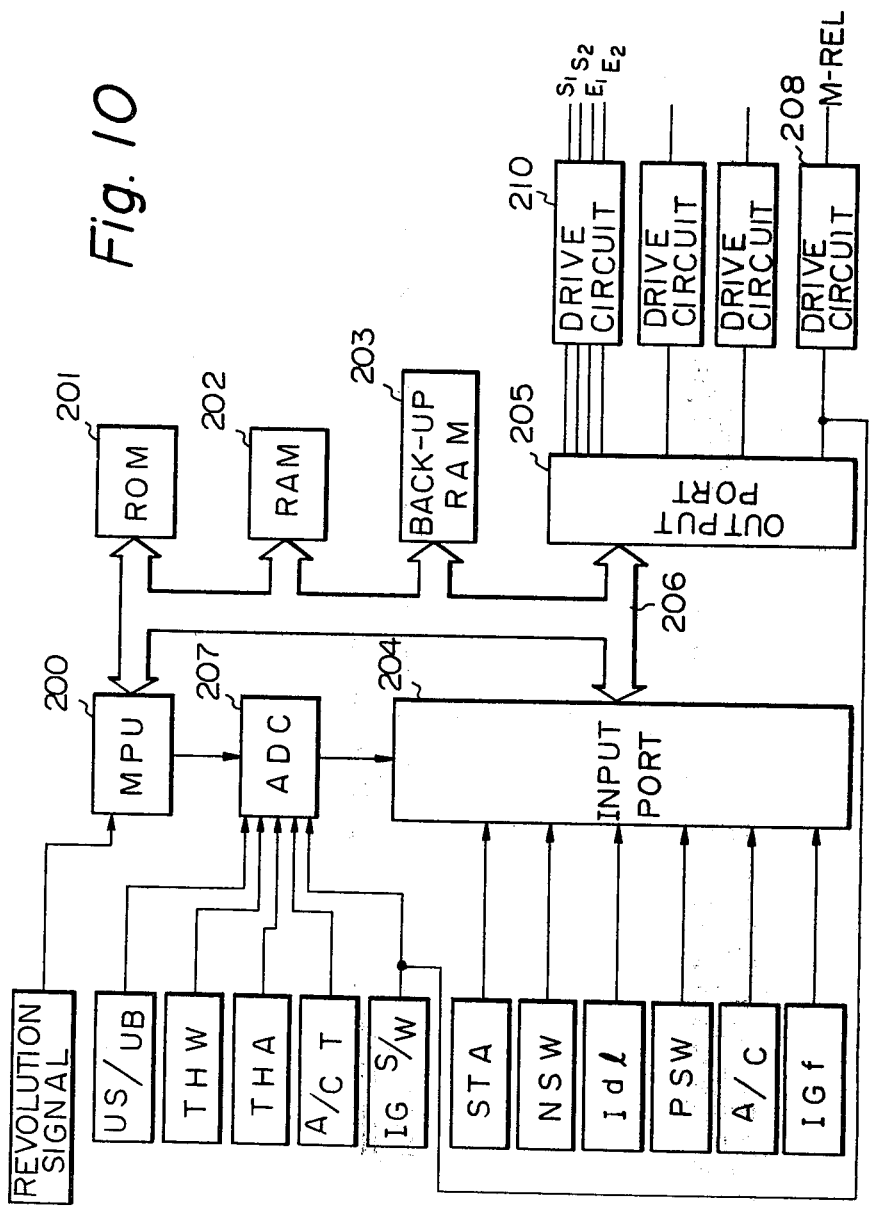
FIG. 10 is a circuit diagram of an electronic control valve.

FIG. 10 illustrates a circuit diagram of the electronic control unit 20 illustrated in FIG. 1. As illustrated in FIG. 10, the electronic control unit 20 comprises a microprocessor (MPU) 200 executing arithmetic and logic processing, a read-only memory (ROM) 201 storing a predetermined control program and an arithmetic constant therein, a random-access memory (RAM) 202 from which data can be read out and in which data can be written, another random-access memory (Back-up RAM) 203 in which stored data is not erased when the power supply is stopped, an input port 204, and an output port 205. The MPU 200, the ROM 201, the RAM 202, the back-up RAM 203, the input port 204, and the output port 205 are interconnected to each other via a bidirectional bus 206. As will be understood from FIG. 10, a starter signal (STA) indicating the operation of starter switch, an air conditioning signal (A/C) indicating the operation of the air conditioning switch, a neutral safety signal (NSW) indicating the operation of the neutral safety switch of the automatic transmission, a throttle close signal (IDL) indicating that the throttle valve 16 (FIG. 1) is in the completely closed state, a throttle open signal (PSW) indicating that the throttle valve 16 is in the fully opened state, and a high voltage generation signal (IGf) issued from the ignitor 23 (FIG. 1) are input into the MPU 200 via the input port 204 and the bus 206. In addition, in an A-D converter (ADC) 207, an analog output signal (US/UB) of the air flow meter 12 (FIG. 1), an ignition switch signal (IG S/W) indicating voltage applied to the ignition switch 25 (FIG. 1), an output signal (THW) of the cooling water temperature sensor, an output signal (THA) of the main air temperature sensor, and an output signal (A/C T) of the evaporater outlet temperature sensor are successively converted to digital signals in a predetermined order and then are input into the MPU 200 via the input port 204 and the bus 206. Interruption is caused in the MPU 200 by the revolution signals issued from the pickup 22, and the engine speed is calculated from the time interval of the revolution signals. A step motor drive signal, a current supply to the ignitor 23, an ignition signal, a drive signal for the fuel injectors 24, and a current supply to the coil 26 are written in the output port 205 in accordance with a predetermined program by the MPU 200 and then are output from the output port 205 via drive circuits. The output port 205 is constructed as a latch and, therefore, if data is written in the output port 205 via the bus 206, the output port 205 continuously produces an output signal corresponding to the data until data indicating that the logic of the output signal of the output port 205 should be inverted is written in the output port 205 via the bus 206.

The ignition switch signal (IG S/W) is input into the input terminal of the drive circuit 208 for exciting the coil 26 of the main relay. The ignition switch signal (IG S/W) and the main relay operation signal issued from the output port 205 are supplied to the wired-OR circuit in the drive circuit 208 so that if the ignition switch 25 is in the ON position, power is supplied to the electronic control unit 20 independently of the main relay operation signal issued from the output port 205.

Figure 11:
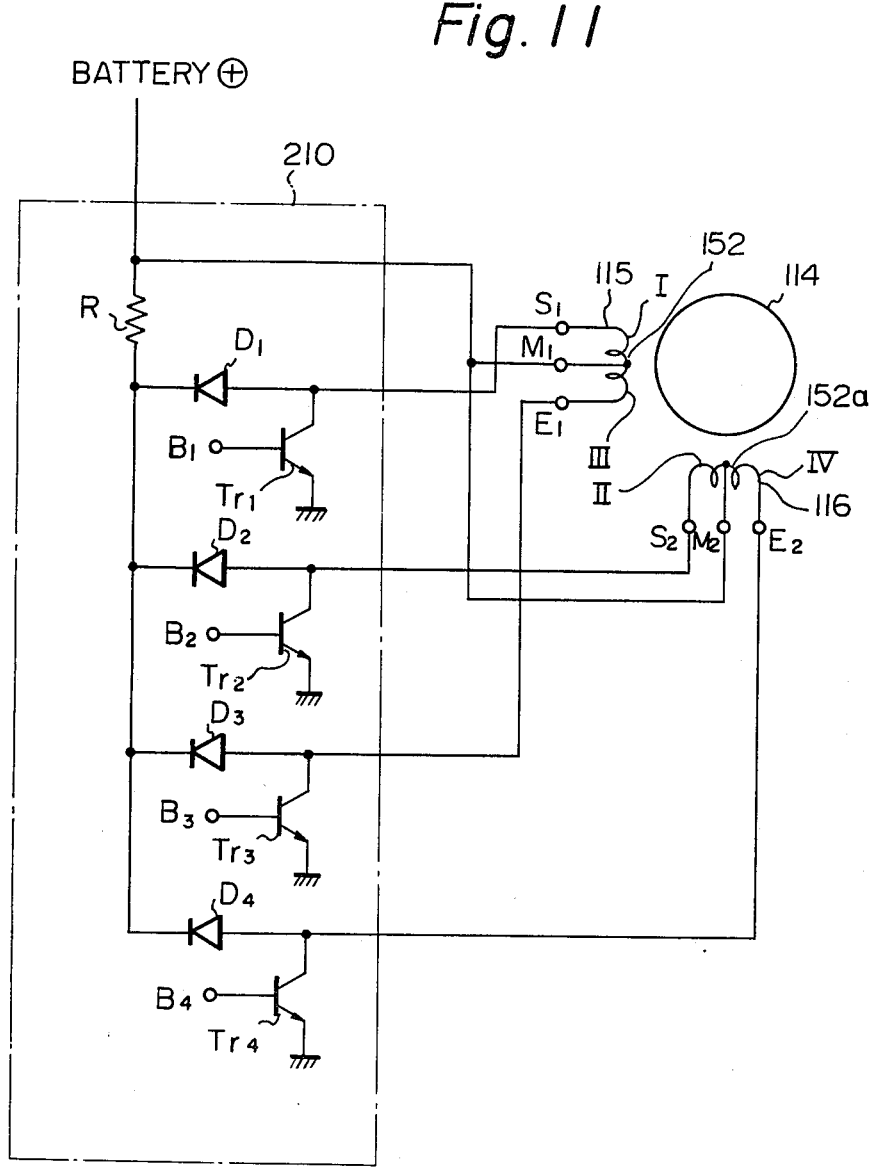
FIG. 11 is a circuit diagram of a step motor drive circuit.

FIG. 11 illustrates a circuit diagram of the step motor drive circuit 210 illustrated in FIG. 10. In FIG. 8, the stator coil 152 of the stator 115 is wound in the same direction as the winding direction of the stator coil 152a of the stator 116. In FIG. 11, the winding start terminals of the stator coils 152 and 152a of the stators 115 and 116 are indicated by $S_1$ and $S_2$, respectively, and the winding end terminals of the stator coils 152 and 152a of the stators 115 and 116 are indicated by $E_1$ and $E_2$, respectively. In addition, in FIG. 11, the intermediate taps of the stator coils 152 and 152a of the stators 115 and 116 are indicated by $M_1$ and $M_2$, respectively. In the stator 115, the stator coil 152, located between the winding start terminal $S_1$ and the intermediate tap $M_1$, constructs a first phase exciting coil I, and the stator coil 152, located between the winding end terminal $E_1$ and the intermediate tap $M_1$, constructs a third phase exciting coil III. In addition, in the stator 116, the stator coil 152a, located between the winding start terminal $S_2$ and the intermediate terminal $M_2$, constructs a second phase exciting coil II, and the stator coil 152a, located between the winding end terminal $E_2$ and the intermediate tap $M_2$, constructs a fourth phase exciting coil IV. As illustrated in FIG. 11, the step motor drive circuit 210 comprises four transistors $Tr_1$, $Tr_2$, $Tr_3$ and $Tr_4$, and the winding start terminals $S_1$ and $S_2$ and the winding end terminals $E_1$ and $E_2$ are connected to the collectors of the transistors $Tr_1$, $Tr_2$, $Tr_3$ and $Tr_4$, respectively. In addition, the intermediate taps $M_1$ and $M_2$ are connected to the plus terminal of the battery (not shown). The collectors of the transistors $Tr_1$, $Tr_2$, $Tr_3$ and $Tr_4$ are connected to the plus terminal of the battery via corresponding diodes $D_1$, $D_2$, $D_3$ and $D_4$ for absorbing a surge current and via a resistor R, and the emitters of the transistors $Tr_1$, $Tr_2$, $Tr_3$ and $Tr_4$ are grounded. In addition, the bases of the transistors $Tr_1$, $Tr_2$, $Tr_3$ and $Tr_4$ are connected to the corresponding output terminals of the step motor drive circuit 210.

Figure 12:
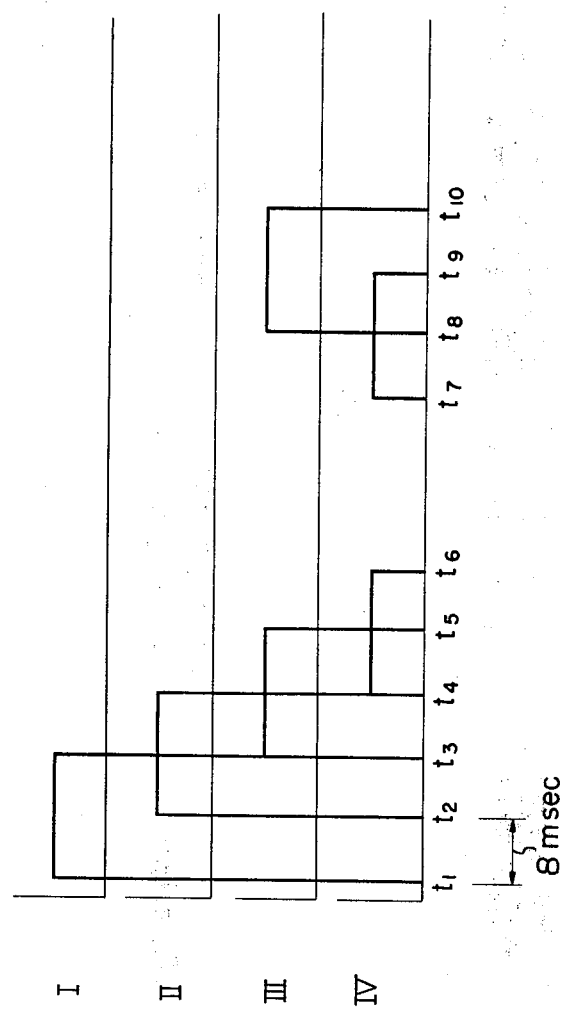
FIG. 12 is a time chart of the control pulses of a step motor.

On the other hand, a function representing a desired relationship between the temperature of the cooling water of the engine and the engine idling speed and a function representing a desired relationship between the position of the air conditioning switch and the engine idling speed are stored in the ROM 201 in the form of a formula or a data table. In the MPU 200, the rotating direction of the step motor 101, which is necessary to equalize the engine speed to a predetermined engine idling speed, is determined from the above-mentioned function and the engine speed at which the engine is now driven and, in addition, step motor drive data, which is necessary to rotate the step motor 101 in a stepping manner in the above-mentioned rotating direction, is obtained. Then the step motor drive data is written in the output port 205. This writing operation of the step motor drive data is executed, for example, every 8 msec. For example, four-bit drive data "1000", indicating that only the transistor $Tr_1$ is turned ON, is written in the output port 205, and the signals "1", "0", "0", "0" are produced at the bases $B_1$, $B_2$, $B_3$, $B_4$ of the transistors $Tr_1$, $Tr_2$, $Tr_3$, $Tr_4$, respectively. As a result, since only the transistor $Tr_1$ is turned ON, the first phase exciting coil I is excited. I, II, III, IV of FIG. 12 illustrate signals produced at the bases $B_1$, $B_2$, $B_3$, $B_4$, respectively. Assuming that, in the MPU 200, it is determined that the step motor 101 should be rotated by three steps in a rotating direction wherein the valve head 129 closes the annular air flow passage 131, the step motor drive data "1000", indicating that only the transistor $Tr_1$ finally is turned ON before the time $t_1$ should be turned ON, is written in the output port 205. Then in the time $t_2$ in FIG. 12, the step motor drive data "1100" is written in the output port 205 for rotating the step motor 101 by one step. Consequently, during the time period from the time $t_2$ to the time $t_3$, both the transistors $Tr_1$ and $Tr_2$ are turned ON and, thus, the first phase exciting coil I and the second phase exciting coil II are excited. Then, at the time $t_3$, the step motor drive data "0110" is written in the output port 205 and, thus, during the time period from the time $t_3$ to the time $t_4$, both the second phase exciting coil II and the third phase exciting coil III are excited. Then, at the time $t_4$, the step motor drive data "0011" is written in the output port 205 and, thus, during the time period from the time $t_4$ to the time $t_5$, both the third phase exciting coil III and the fourth phase exciting coil IV are excited. Then, at the time $t_5$, the step motor drive data "0001" is written in the output port 205 and, thus, during the time period from the time $t_5$ to the time $t_6$, only the fourth phase exciting coil IV is excited. Then, at the time $t_6$, the step motor drive data "0000" is written in the output port 205 and, thus, all the transistors $Tr_1$, $Tr_2$, $Tr_3$, $Tr_4$ are turned OFF. By successively exciting the exciting coils I, II, III, IV as mentioned above, the step motor 101 is rotated by three steps.

On the other hand, at the time $t_7$, if it is determined in the MPU 200 that the step motor 101 should be rotated by one step in a rotating direction wherein the valve head 129 opens the annular air flow passage 131, the step motor drive data "0001", indicating that only the transistor $Tr_4$ is turned ON, is written in the output port 205. Consequently, during the time period from the time $t_7$ to the time $t_8$, only the fourth phase exciting coil IV is excited. Then, at the time $t_8$, the step motor drive data "0011" is written in the output port 205 and, thus, during the time period from the time $t_8$ to the time $t_9$, both the third phase exciting coil III and the fourth phase exciting coil IV are excited. Then, at the time $t_9$, the step motor drive data "0010" is written in the output port 205 and, thus, during the time period from the time $t_9$ to the time $t_{10}$, only the third phase exciting coil III is excited. Then, at the time $t_{10}$, the step motor drive data "0000" is written in the output port 205 and, thus, all the transistors $Tr_1$, $Tr_2$, $Tr_3$, $Tr_4$ are turned OFF. By successively exciting the exciting coils IV and III as mentioned above, the step motor 101 is rotated by one step.

Figure 13:
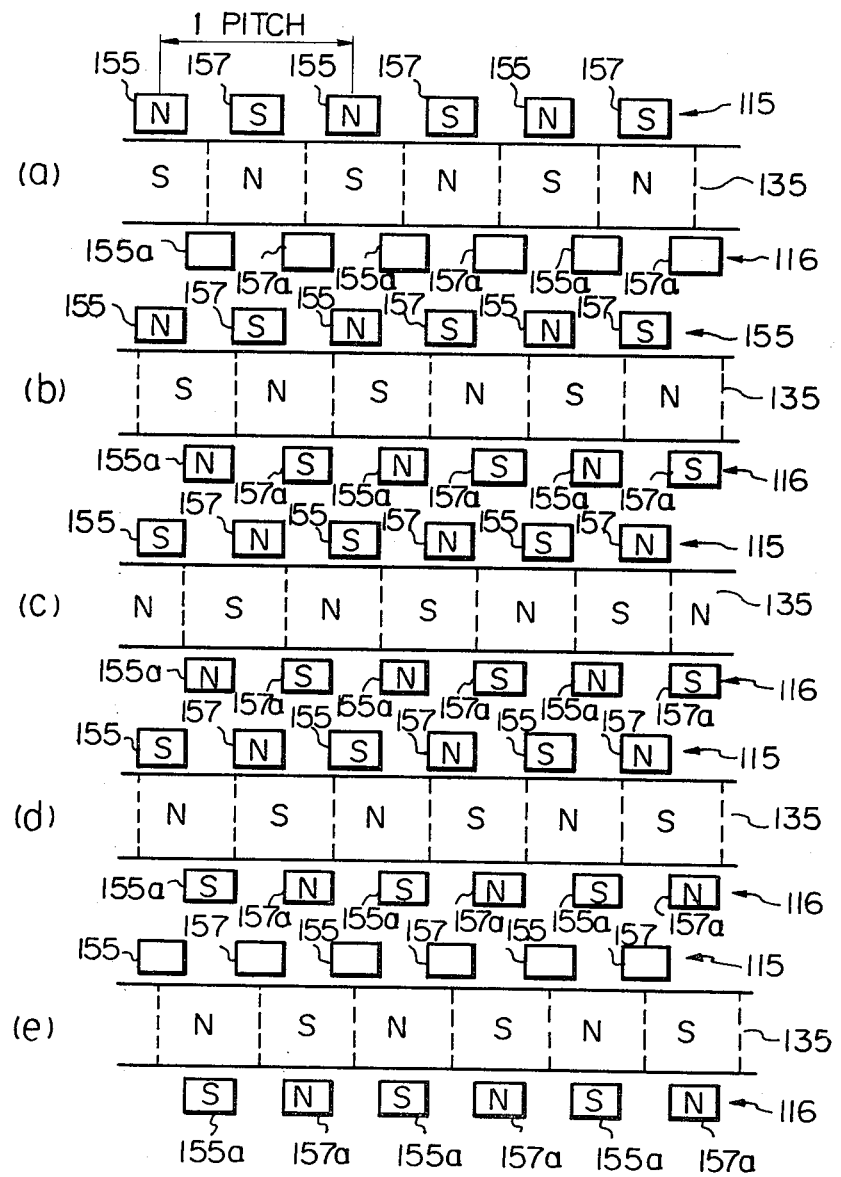
FIG. 13 is a schematically illustrative view of the stator and the rotor of a step motor.

FIG. 13 illustrates a schematic view of the outer circumferential surface of the hollow cylindrical outer body 135 of the rotor 114 and the pole pieces 155, 155a, 157, 157a of the stators 115, 116. In FIG. 13, (a) illustrates the case wherein only the first phase exciting coil I is excited as illustrated in FIG. 12 between the time $t_1$ and the time $t_2$. At this time, the polarity of the pole pieces 155 of the stator 115 is N, and the polarity of the pole pieces 157 of the stator 115 is S. Contrary to this, the polarity does not appear on the pole pieces 155a, 157a of the stator 116. Consequently, at this time, the rotor 114 remains stationary at a position wherein each of the pole pieces 155 of the stator 115 faces the corresponding S pole of the hollow cylindrical outer body 135 and each of the pole pieces 157 of the stator 115 faces the corresponding N pole of the hollow cylindrical outer body 135. When the second phase exciting coil II is excited, as illustrated between the time $t_2$ and the time $t_3$ in FIG. 12, since the flow direction of the current in the secondary phase exciting coil II is the same as that of the current in the first phase exciting coil I, the polarity of the pole pieces 155a of the stator 116 becomes N, and the polarity of the pole pieces 157a of the stator 116 becomes S, as illustrated in FIG. 13 (b). Consequently, at this time, the hollow cylindrical outer body 135 moves to a position wherein each of the S poles of the hollow cylindrical outer body 135 is located between the corresponding pole pieces 155 of the stator 115 and the corresponding pole pieces 155a of the stator 116, and each of the N poles of the hollow cylindrical outer body 135 is located between the corresponding pole pieces 157 of the stator 115 and the corresponding pole pieces 157a the stator 116. Therefore, assuming that the distance between the adjacent two pole pieces 155 of the stator 115 is one pitch, as mentioned previously, the hollow cylindrical outer body 135 moves by ⅛ of a pitch towards the right in FIG. 13 from the position illustrated in FIG. 13 (a) to the position illustrated in FIG. 13 (b).

After this, when the third phase exciting coil III is excited, as illustrated between the time $t_3$ and the time $t_4$ in FIG. 12, since the flow direction of the current in the third phase exciting coil III is opposite to that of the current in the first phase exciting coil I, the polarity of the pole pieces 155 of the stator 115 becomes S, and the polarity of the pole pieces 157 of the stator 115 becomes N as illustrated in FIG. 13 (c). As a result of this, the hollow cylindrical outer body 135 moves by ⅛ of a pitch towards the right in FIG. 13 from the position illustrated in FIG. 13 (b) to the position illustrated in FIG. 13 (c). In the same manner as described above, when the fourth phase exciting coil IV is excited, as illustrated between the time $t_4$ and the time $t_5$ in FIG. 12, the hollow cylindrical outer body 135 moves by ⅛ of a pitch towards the right in FIG. 13 from the position illustrated in FIG. 13 (c) to the position illustrated in FIG. 13 (d). After this, during the time period from the time $t_5$ to the time $t_6$, only the fourth phase exciting coil IV is excited and, thus, the polarity does not appear on the pole pieces 155, 157 of the stator 115 as illustrated in FIG. 13 (e). Consequently, at this time, the hollow cylindrical outer body 135 moves by ⅛ of a pitch towards the right in FIG. 13 from the position illustrated in FIG. 13 (d) to the position illustrated in FIG. 13 (e) so that each of the pole pieces 155a of the stator 116 faces the corresponding N pole of the hollow cylindrical outer body 135 and each of the pole pieces 157a of the stator 116 faces the corresponding S pole of the hollow cylindrical body 135. Then, at the time $t_6$ in FIG. 12, all the transistors $Tr_1$, $Tr_2$, $Tr_3$, $Tr_4$ are turned OFF and, thus, the exciting operation of all the exciting coils I, II, III, IV is stopped. At this time, as illustrated in FIG. 13 (e), each of the pole pieces 155a of the stator 116 faces the corresponding N pole of the hollow cylindrical outer body 135 and each of the pole pieces 157a of the stator 116 faces the corresponding S pole of the hollow cylindrical outer body 135. Consequently, the hollow cylindrical outer body 135 is kept stationary at the position illustrated in FIG. 13 (e) due to the attracting forces of the N pole and the S pole of the hollow cylindrical outer body 135, which forces act on the pole pieces 155a and the pole pieces 157a of the stator 116, respectively.

When only the fourth phase exciting coil IV is again excited as illustrated between the time $t_7$ and the time $t_8$ in FIG. 12, since the hollow cylindrical outer body 135 is located in the position illustrated in FIG. 13 (e), the hollow cylindrical outer body 135 remains stationary. After this, when the third phase exciting coil III is excited as illustrated between the time $t_8$ and the time $t_9$ in FIG. 12, the polarities, as illustrated in FIG. 13 (d), appear on the pole pieces 155, 155a, 157, 157a of the stators 115, 116 and, thus, the hollow cylindrical outer body 135 moves by ⅛ of a pitch towards the left in FIG. 13 from the position illustrated in FIG. 13 (e), to the position illustrated in FIG. 13 (d).

As illustrated between the time $t_1$ and the time $t_6$ in FIG. 12, when the exciting coils I, II, III, IV are successively excited from the first phase exciting coil I to the fourth phase exciting coil IV, the hollow cylindrical outer body 135 of the rotor 114 moves relative to the stators 115, 116 and, accordingly, the rotor 114 rotates in one direction. When the rotor 114 rotates, since the external screw threads 122 of the valve shaft 113 is engaged with the internal screw threads 140 of the hollow cylindrical inner body 133, as illustrated in FIG. 2, the valve shaft 113 is caused to move in one direction, for example, towards the left in FIG. 2. As a result of this, since the cross-sectional area of the annular air flow passage 131 formed between the valve head 129 and the valve seat 112 is increased, in FIG. 1, the amount of air fed via the air conduit 18 into the surge tank 14 from the intake duct 13 located upstream of the throttle valve 16 is increased. Contrary to this, during the time period between the time $t_7$ and the time $t_{10}$ in FIG. 12, since the valve shaft 113 is caused to move towards the right in FIG. 2, the cross-sectional area of the annular air flow passage 131 formed between the valve head 129 and the valve seat 112 is reduced.

Figure 14:
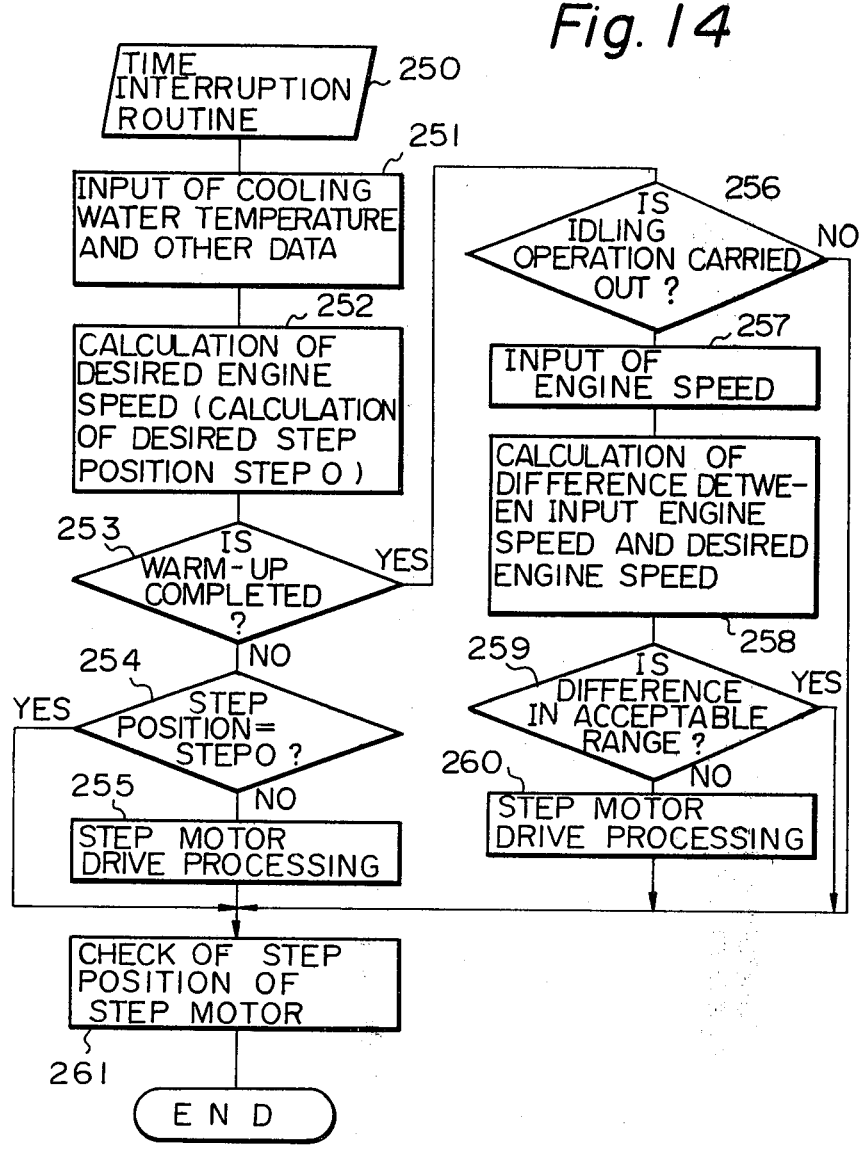
FIG. 14 is a flow chart illustrating the general flow of the operation of an embodiment according to the present invention.

Figure 14 illustrates a flow chart of the general flow of an idling speed control operation which is executed by the MPU 200. In FIG. 14, the routine, indicated by stage 250, is processed by sequential interruptions which are executed periodically every 8 msec. If the processing cycle is started, firstly, in stage 251, the cooling water temperature and other data are input into the MPU 200. Then, in stage 252, the desired engine speed (and the desired step position STEPO), which is optimum in view of the cooling water temperature, is calculated from the data table stored in the ROM 201 and having the relationship illustrated in FIG. 15. Then the desired engine speed (and the desired step position STEPO) is temporarily stored in the RAM 202. Then, in stage 253, it is determined whether the warm-up of the engine is completed. If the warm-up of the engine is not completed, in stages 254 and 255, the step motor 101 is rotated so that the step position of the step motor 101 becomes equal to the desired step position STEPO and, as a result, the amount of air flowing within the air conduit 18 is so controlled that the engine speed becomes equal to the desired engine speed.

On the other hand, if it is determined in stage 253 that the warm-up of the engine is completed, the routine goes to stage 256 for executing the idling speed control only when the engine is idling, that is, when the throttle valve 16 is substantially closed. That is, when the engine is idling, the difference between the desired engine speed and the engine speed at which the engine is presently operating is calculated in stage 258. Then, in stages 259 and 260, the step motor 101 is rotated only when the difference, obtained in stage 258, is not in a predetermined acceptable range so that the difference is reduced to a value contained within the predetermined acceptable range.

Referring to FIG. 14, stage 261 is provided, in which the step position of the step motor 101 is checked every time the routine goes to stage 261. As mentioned above, when the routine goes to stages 255 or 260, the step motor 101 is rotated, and the data, indicating the step position of the step motor 101, is stored in a predetermined address of the RAM 202 or in a predetermined address of the back-up RAM 203. In addition, the step position of the step motor 101, which is stored in the RAM 202 or the back-up RAM 203, is updated every time the step position of the step motor 101 is changed. However, in the case where the power supply to the electronic control unit 20 is momentarily cut off, or in the case where the MPU 200 runs away and executes a processing except for a predetermined processing, there is a possibility that the data, indicating the step position of the step motor 101 and stored in the RAM 202 or the back-up RAM 203, will be incorrectly rewritten. Consequently, it is necessary to judge whether such data is true or false and, therefore, stage 261 is provided.

The operation, executed in step 261, will be hereinafter described in detail. In the present invention, in order to judge whether the stored data, indicating the step position of the step motor 101, is true or false, the data, indicating the step position of the step motor 101, is always stored in a plurality of memories, the number of which is preferably more than three. When the data, stored in the memories, is not the same, it is determined that the storing operation of the data is abnormal. At this time, the idling speed of the engine is controlled by controlling the step motor so that the step position of the step motor becomes equal to a step position which is determined on the basis of the cooling water temperature.

Figure 16:
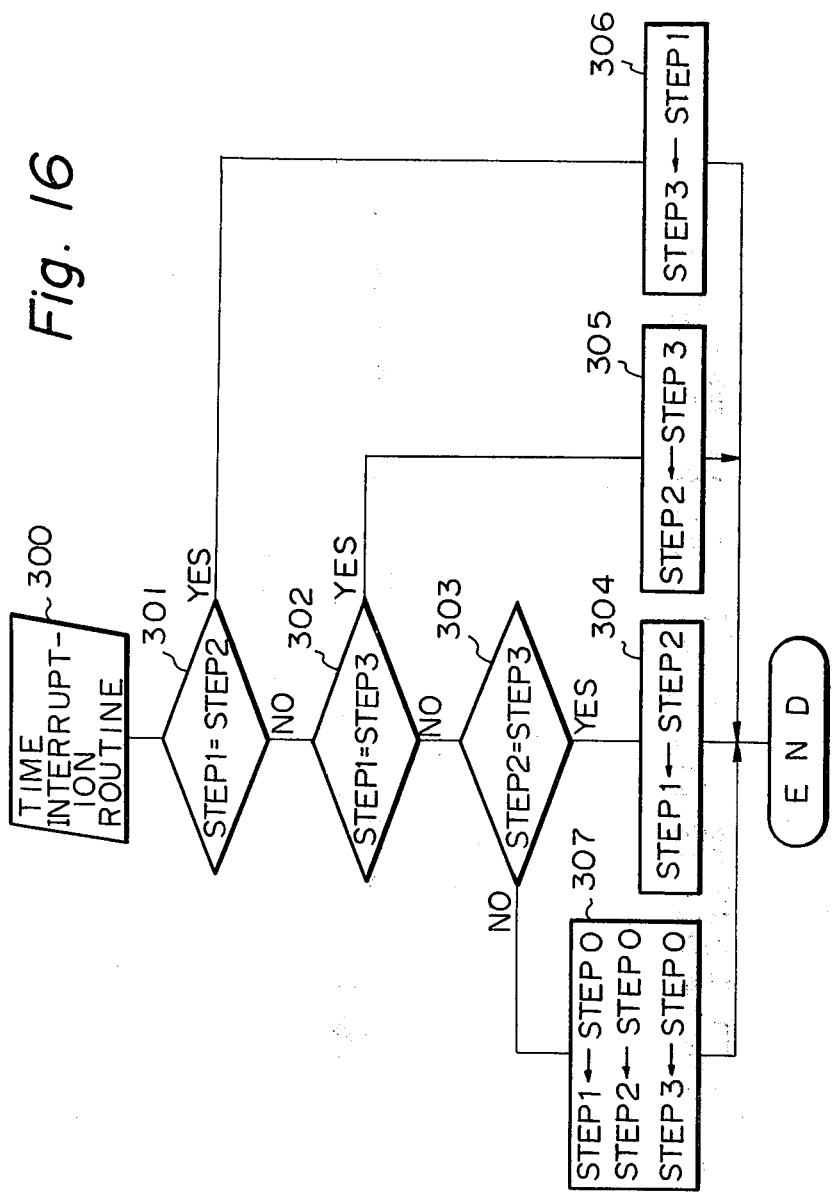
FIG. 16 is a flow chart for checking the step position of a step motor.

FIG. 16 illustrates a flow chart for checking the step position of the step motor 101. In this embodiment, the data, indicating the step position of the step motor 101, is stored in three memories (three different predetermined address in the RAM 202) as STEP 1, STEP 2, and STEP 3. Referring to FIG. 16, stage 300 means that the check of the step position is processed by sequential interruptions which are executed periodically at predetermined times. In this embodiment, taking the responsiveness of the step motor 101 relative to the step motor drive pulse into consideration, the interruption is executed every 8 msec. In stage 301, it is determined whether the value of STEP 1, which indicates the step position of the step motor 101 and is stored in one of the memories, is equal to the value of STEP 2, which indicates the step position of the step motor 101 and is stored in the other memory. If the value of STEP 1 is equal to the value of STEP 2, the routine goes to stage 306. In stage 306, the value of STEP 1 is put into the value of STEP 3, which is stored in the corresponding memory. Contrary to this, if it is determined in stage 301 that the value of STEP 1 is not equal to the value of STEP 2, the routine goes to stage 302. In stage 302, it is determined whether the value of STEP 1 is equal to the value of STEP 3. If the value of STEP 1 is equal to the value of STEP 3, the routine goes to stage 305, and the value of STEP 3 is put into the value of STEP 2. If it is determined in stage 302 that the value of STEP 1 is not equal to the value of STEP 3, the routine goes to stage 303. In stage 303, it is determined whether the value of STEP 2 is equal to the value of STEP 3. If the value of STEP 2 is equal to the value of STEP 3, the routine goes to stage 304, and the value of STEP 2 is put into the value of STEP 1. Consequently, from FIG. 16, it will be understood that if two of the three values of STEP 1, STEP 2, and STEP 3 are equal to each other, the remaining value must be equal to the above-mentioned two values.

On the other hand, if it is determined in stage 303 that the value of STEP 2 is not equal to the value of STEP 3, the routine goes to stage 307. In stage 307, the desired step position STEP 0 is calculated from the relationship illustrated in FIG. 15 on the basis of the cooling water temperature and then the desired step position STEP 0 is pup into STEP 1, STEP 2, and STEP 3.

Figure 15:
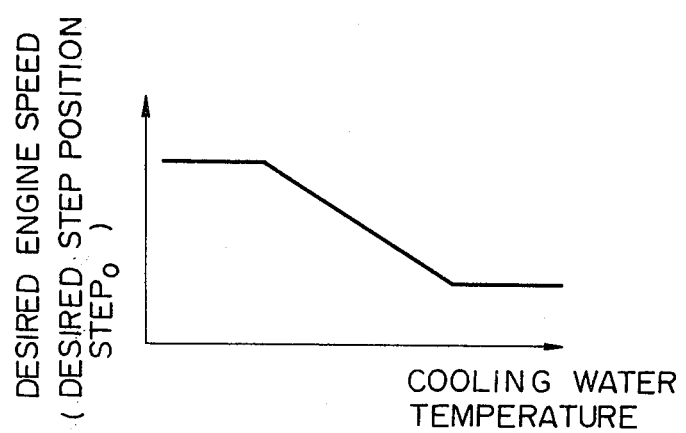
FIG. 15 is a diagram illustrating the relationship between the step position of a step motor and the temperature of the cooling water of an engine.

In the present invention, in the case where at least two of the values of STEP 1, STEP 2, and STEP 3, which are stored in the different memories, are the same, the majority value is adopted as a true value, that is, the majority logic is adopted. Contrary to this, in the case wherein all the values of STEP 1, STEP 2, and STEP 3 are different, the data, determined from the relationship illustrated in FIG. 15, is adopted as true data. In the embodiment illustrated in FIG. 14, stage 261 is inserted after stages 255 and 260. However, instead of inserting stage 261 as mentioned above, stage 261 may be inserted between stages 252 and 253.

Figure 17:
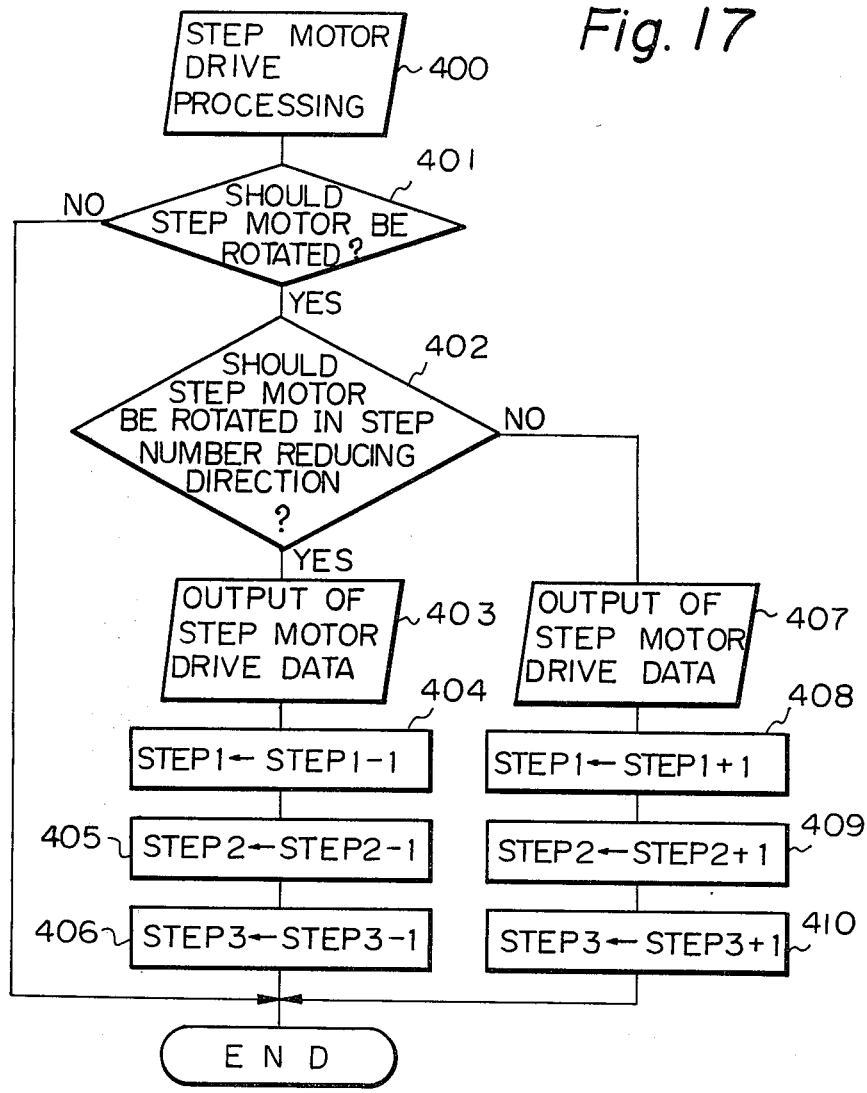
FIG. 17 is a flow chart of step motor drive processing.

FIG. 17 illustrates a flow chart of the step motor drive processing executed in stages 255 and 260 of FIG. 14. Referring to FIG. 17, in stage 401, it is determined whether the step motor 101 should be rotated and, if it is determined in stage 401 that the step motor 101 should not be rotated, the processing cycle is completed. Contrary to this, if it is determined in stage 401 that the step motor 101 should be rotated, the routine goes to stage 402. In stage 402, it is determined whether the step motor 101 should be rotated in a rotating direction wherein the step number of the step position is reduced. If it is determined in stage 402 that the step motor 101 should be rotated in a rotating direction wherein the step number is reduced, the routine goes to stage 403. In stage 403, the step motor drive data, which is necessary to rotate the step motor 101 by one step in a rotating direction wherein the step number is reduced, is obtained from the data stored in the RAM 202 and written in the output port 205. In stages 404, 405 and 406, the values of STEP 1, STEP 2 and STEP 3 are decreased by one, respectively.

On the other hand, if it is determined in stage 402 that the step motor 101 should be rotated in a rotating direction wherein the step number of the step position is increased, the routine goes to stage 407. In stage 407, the step motor drive data, which is necessary to rotate the step motor 101 by one step in a rotating direction wherein the step number is increased, is obtained from the data stored in the RAM 202 and written in the output port 205. In stages 408, 409, and 410, the values of STEP 1, STEP 2, and STEP 3 are increased by one, respectively.

In the present invention, the step position of the step motor 101 is stored in the RAM 202. However, instead of storing the step position in the RAM 202, the step position may be stored in the back-up RAM 203. In this case, even if the voltage of the battery is reduced as in the starting operation of the engine, the correct step position can be continuously stored.

In addition, in the present invention, the step position of the step motor 101 is stored by using three words in the RAM 202. However, the step position of the step motor 101 may be stored in the RAM 202 by two words or more than four words.

Furthermore, in the present invention, no sensor is provided for detecting the present step position or a particular step position of the step motor, and the step position of the step motor is determined only by the data stored in the RAM 202. Therefore, it is preferable that the routine illustrated in FIG. 14 include a processing for judging whether the data stored in the RAM 202 corresponds to the actual step position of the step motor and for rewriting the data stored in the RAM 202 so that the stored data corresponds to the actual step position when the stored data does not correspond to the actual step position. For example, in this processing, when the ignition switch 25 is turned OFF, the valve head 129 is returned to the fully opened position or the fully closed position by rotating the step motor 101. Then the data stored in the RAM 202 is rewritten so that the stored data corresponds to the actual step position of the step motor 101. By rewriting the stored data, it is possible to obtain a further stable and precise idling speed control.

According to the present invention, it is possible to precisely control the idling speed of an engine by controlling the amount of air flowing within the bypass pipe by means of a step motor. In addition, in the present invention, the data, indicating the step position of the step motor, is stored in a plurality of memories at the same time, and the step position of the step motor is determined by comparing the data stored in the memories. Consequently, since it is possible to correctly determine the step position of the step motor, precise control of the idling speed can be obtained.

While the invention has been described by reference to a specific embodiment chosen for purposes of illustration, it should be apparent that numerous modifications could be made thereto by those skilled in the art without departing from the basic concept and scope of the invention.

We claim:

1. A device for controlling the idling speed of an engine comprising a main intake passage, a throttle valve arranged in the main intake passage, a bypass passage branching off from the main intake passage upstream of the throttle valve and being connected to the main intake passage downstream of the throttle valve, and a control valve arranged in the bypass passage, said device comprising:

a step motor actuating the control valve and having a plurality of step positions which are changed in accordance with the rotating motion of said step motor;

a plurality of memories each storing data which indicates the step position at which said step motor is positioned;

first means for comparing the step positions stored in said memories and determining the actual step position of said step motor;

second means for detecting the operating condition of the engine to produce an output signal indicating that the engine is idling; and electronic control means operated in response to the output signal of said second means and producing a step motor drive signal for rotating said step motor until said actual step position becomes equal to a predetermined desired step position when the engine is idling.

2. A device according to claim 1, wherein said device comprises a RAM and predetermined addresses are used as said memories.

3. A device according to claim 2, wherein said RAM is a back-up RAM.

4. A device according to claim 1, wherein said first means constructs a majority logic in which majority data among the data stored in said memories is adopted as data indicating said actual step position.

5. A device according to claim 4, wherein said first means comprises at least three memories and, when at least two pieces of data among the data stored in said memories are the same, said first means determines said two data as data indicating said actual step position.

6. A device according to claim 1, wherein said first means determines predetermined data as data indicating said actual step position when all the data stored in said memories is different.

7. A device according to claim 6, wherein said device comprises another memory storing the relationship between the cooling water temperature and the step position, said predetermined data indicating said step position stored in said other memory and changed in accordance with a change in the cooling water temperature.

* * * * *